United States Patent Office.

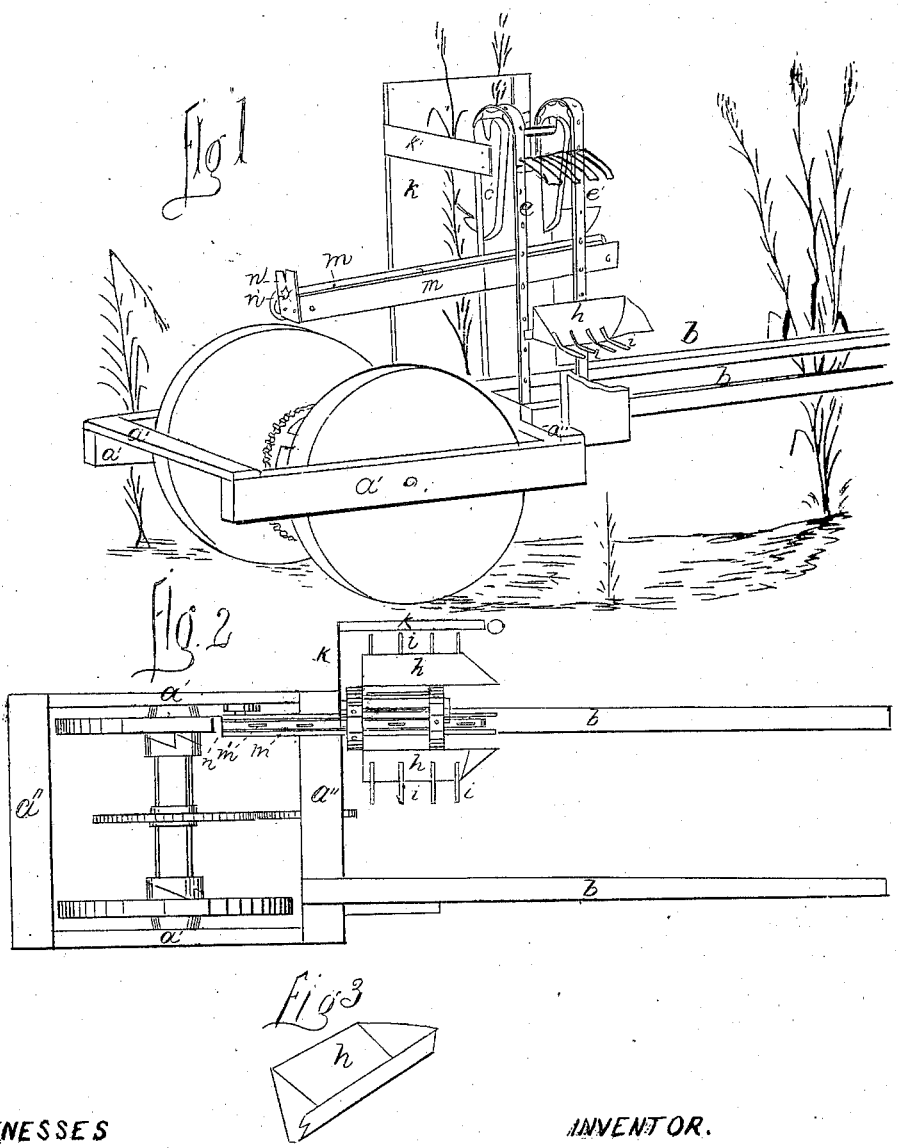

EDMUND W. QUINCY, OF LACON, ILLINOIS.

Letters Patent No. 79,775, dated July 7, 1868.

IMPROVEMENT IN CORN-HARVESTERS.

*The Schedule referred to in these Letters Patent and making part of the same.*

TO ALL WHOM IT MAY CONCERN:

Be it known that I, EDMUND W. QUINCY, of Lacon, in the county of Marshall, and State of Illinois, have invented a new and useful Corn-Harvester and Shucker; and I do declare that the following is a clear and exact description of the construction and operation of the same, reference being had to the annexed drawings.

Figure 1 is a perspective view of my invention.

Figure 2 is a plan view of the same.

Figure 3 is a detached view of a bucket.

To enable others skilled in the art to make and use my invention, I will proceed to describe its construction and operation.

This invention consists of a mechanism for gathering ears of corn from the stalks in the field, and shucking the same at one operation, as will hereinafter more fully appear.

I employ a wooden frame, composed of two side-pieces, $a'$, and two cross-pieces, $a''$, the latter being bolted to the former, thus avoiding the use of mortises and tenons. Within this frame are placed the gearing and master-wheels, by means of which the machine is moved and operated. To the forward cross-piece $a''$ are attached the thills $b$, for the connection of a draught-animal. To each thill, near its rear end, is attached an elevating-apparatus, the same consisting of a board frame, $c$, of suitable height, at the top of which are placed brackets, $c'$, which support a shaft, $d$, bearing at each end a toothed roller, $d'$. Over each roller $d'$ runs an endless chain, $e$, passing around suitable mechanism at the bottom.

To the endless chain, buckets $h$ are fastened horizontally, the same consisting preferably of malleable iron, and being four in number, each twenty-two inches long, four inches wide, and eight deep. These dimensions are suggested as the most convenient. The outer edge of each bucket may be sharp or blunt, as desired, its function being to detach ears of corn from the stalk, an operation which may be performed by a blunt edge when the ears are dry, but which requires a sharp one when the ears are moist. The forward ends of the buckets I have represented as peaked, the slope being from the outer to the inner side thereof, in order to press the stalks with which they may come in contact, toward the brace-boards $k$. I do not intend, however, to limit myself to this shape of the ends of my buckets, as they may be made square or round. Metallic fingers, $i$, are placed on the front edges of the buckets to assist in the operation, or these fingers may be fastened to a band attached to the endless chains, buckets being dispensed with. I consider, however, the use of buckets more advantageous than their disuse.

$k$ represents a board frame, of somewhat larger dimensions than the frame $c$, and fastened to the latter or the brackets $c'$, by means of metallic braces $k$, at a sufficient distance to admit of the inclusion, between the two frames $c$ and $k$, of the stalks in a hill of corn; the machine being intended to be drawn between two rows, and to include the stalks of both at the same time between its two sets of frames $c$ and $k$, it being my intention to have two frames $k$, which I call brace-boards, one at each side.

By means of suitable gearing, motion is communicated to the elevating-apparatus as the machine is drawn along. The stalks are pressed by the sloping ends of the buckets against the brace-boards, and by them are prevented from being beaten down so as to escape the action of the machine by the buckets, as they come in contact with the lower parts of the stalks. In order to facilitate the entrance of the stalks between the buckets and the brace-boards, the latter are provided at their front edges with vertical rollers $l$, firmly attached to said brace-boards, yet in such manner as to be capable of rotation under the pressure of the stalks. The latter being compressed between the buckets and the brace-board, the edges thereof detach the ears, which fall into the buckets. The ears on the opposite sides of the stalks next the brace-board, which the edges of the buckets cannot come in contact with, are reached and detached by the fingers $i$. The ears are conveyed by the buckets upward and over the top of the elevating-apparatus, until the buckets are inverted, when their contents fall into the spout $m$. Within this spout works an endless apron, armed with prongs $m'$, by means of which the ears are conveyed one after another to the mouth of the spout, which is closed with a piece of sheet metal, $n$, in which is the shucking-orifice $n'$, around which are teeth, so arranged that as the ears pass through the orifice, the husks are stripped off them. The ears pass on and are conveyed away by an apparatus not shown.

The ears are forced through the orifice $n'$ by means of the prongs $m'$. The teeth around the orifice are flexible and elastic, so as to accommodate themselves to ears of different sizes.

It will be seen that by placing the master-wheels within the frame, and the elevating-apparatus with the buckets upon the thills, I obtain space for the stalks to pass clear from contact with anything but the buckets.

The apparatus above referred to as conveying away the stripped ears, consists of a spout leading into a wagon running by the side of the machine; said spout being hinged so as to communicate with a wagon running at either side of the machine. The fingers $i$ may occasionally operate with advantage, if made with a cutting-edge, as when the ears of corn are moist. To facilitate the employing of the buckets, their rear sides should not be as high as their front sides, as the discharge of the contents takes place over the rear sides, when the buckets are sufficiently turned up.

Having thus described my invention, what I claim as new, and desire to secure by Letters Patent, is—

1. The brace-board $k$, applied to a corn-harvesting machine, substantially as and for the purpose described.

2. The elevating and gathering-apparatus, constructed as described, when applied, in combination with the brace-board $k$, to a corn-harvesting machine, substantially as and for the purpose described.

3. The combination of the shucking with the gathering-apparatus, the former consisting of the spout $m$ with its endless apron, said apron having prongs $m'$, and the plate $u$ with its stripping-orifice $n'$, said orifice being made capable of accommodating itself to ears of different sizes, as and for the purpose set forth.

4. The buckets $h$, when constructed with their front sides higher than their rear sides, as and for the purpose described.

5. The vertical rollers $l$ in combination with the brace-boards, as and for the purposes described.

EDMUND W. QUINCY.

Witnesses:
   GEO. E. BROWN,
   CHAS. F. BROWN.